United States Patent [19]

Price et al.

[11] 4,158,682

[45] Jun. 19, 1979

[54] CONTROL OF CARBON BLACK DENSIFICATION

[75] Inventors: Charles R. Price, Macon, Ga.; Jimmy J. Hines, Borger; Ronald L. Howell, Baytown, both of Tex.

[73] Assignee: J. M. Huber Corporation, Locust, N.J.

[21] Appl. No.: 834,853

[22] Filed: Sep. 19, 1977

Related U.S. Application Data

[63] Continuation of Ser. No. 698,450, Jun. 21, 1976, abandoned, which is a continuation of Ser. No. 574,656, May 6, 1975, abandoned, which is a continuation of Ser. No. 316,968, Dec. 20, 1972, abandoned.

[51] Int. Cl.² ............................................... B01J 2/10

[52] U.S. Cl. .................. 264/40.4; 264/40.7; 264/117

[58] Field of Search ....................... 264/117, 40.4, 40.7

[56] References Cited

U.S. PATENT DOCUMENTS

| 2,699,381 | 1/1955 | King | 264/117 |
| 2,843,874 | 7/1958 | Wood | 264/117 |
| 3,277,218 | 10/1966 | Dollinger | 264/117 |
| 3,657,400 | 4/1972 | Williams | 264/117 |

Primary Examiner—Robert F. White
Assistant Examiner—J. R. Hall
Attorney, Agent, or Firm—Ernest Schaal; Harold H. Flanders

[57] ABSTRACT

A method of controlling the bulk or pour density of carbon black without altering its rubber reinforcing properties, by wet micropulverizing prior to pin mixing.

1 Claim, 4 Drawing Figures

FIGURE 1

FIGURE 4
RELATIONSHIP BETWEEN DBP ABSORPTION
AND POUR DENSITY FOR ISAF

CONTROL OF CARBON BLACK DENSIFICATION

This is a continuation, of application Ser. No. 698,450 filed June 21, 1976, which is a continuation of Ser. No. 574,656, filed May 6, 1975, which is a continuation of 316,968, filed Dec. 20, 1972 all abandoned.

BACKGROUND OF THE INVENTION

The present invention involves the post-manufacture treatment of fluffy carbon black to densify and pelletize it. More specifically, it involves a method and apparatus for increasing bulk or pour density of carbon black.

In several prior art methods of densifying carbon black the physico-chemical properties are changed significantly so that rubber manufacturer's specifications can not be met and the densification is unsuccessful economically. These methods involve varying parameters within the furnace itself or else involve changing from one type pin mixer to another in the pelletizing system. Also, various binders have been used in the pelletizer and somewhat cumbersome and inefficient control is obtained by changing pin mixers or binders.

The use of a micropulverizer on dry carbon black is old in the art as revealed by U.S. Pat. Nos. 2,843,874 and 2,917,374 which disclose a micropulverizer attached to a surge tank to apply work to dry fluffy carbon black which is received from a collection system. No method of control is shown for the micropulverizer.

Wet milling of carbon black to reduce oil absorption is disclosed in Japan Pat. No. 36,9170. The entire moisture content of the black is added prior to the wet milling. No system of control is given for maintaining constant levels of moisture.

The present invention differs from the above processes by simultaneously wetting and micropulverizing fluffy carbon black using a portion of the wetting material normally added in pelletization. The present invention also adds the wetting fluid directly to the carbon black in the micropulverizer rather than prewetting and includes controls for maintaining a constant ratio of carbon black to wetting fluid. The present invention may be used in conjunction with carbon black pelletization.

Carbon black particles are believed to be constructed of several carbon nuclei agglomerated together into a chain-like particle or structure. Some of the nuclei are apparently fused strongly together and some appear to be loosely joined by weak forces such as Van der Waal's forces. The structure arising from the strongly fused nuclei is very resistant to breakage and can be destroyed only by severe physical working. This type structure is referred to as persistent structure. The numerous carbon nuclei and persistent-structured agglomerates which are held to each other by the weaker forces of attraction constitute what is termed transient structure. Transient structure can be broken down into carbon nuclei and individual persistent structures by physical working which is much less severe than that required to break down persistent structure.

It has been found that the density of a macroscopic quantity of carbon black is dependent in part upon the degree of structure of the black particles. High-structured black tends to be less dense than does low-structured black as a result of the high incidence of voids in high-structured black caused by the long and irregularly shaped high-structure particle.

It is well known to use a physical milling process to increase the density of carbon black prior to pelletization although dry milling achieves very little reduction in structure.

A reduction of the transient structure has little effect on the physico-chemical properties of the black other than pour density, DBP and specific volume, but a reduction of the persistent structure results in a drastic change in many of these properties.

While carbon blacks can be used in most products without undergoing any reduction in transient structure, it is uneconomical and impractical to convey, store, and use the black in this highly fluffy and deflocculated state. It is difficult to package and results in contamination of the manufacturing facilities.

Thus, in retrospect, it is believed that an almost total reduction in the transient structure of carbon black without affecting persistent structure results in obtaining maximum pour density for the black without changing any of its other significant physico-chemical properties. Many of the known methods of physical working of carbon black result in not only breaking the transient structure, but also, because of the severe physical working involved, destroy the persistent structure and adversely degrade the desirable properties of the black. One such property which is degraded is the reinforcing ability of the black in rubber which appears to be highly dependent upon the degree of persistent structure present in the black.

In the prior art, the common method of densifying is by wet pelleting in a pin mixer type pelletizer. This changes the fluffy black into a pill form but significant reduction in transient structure in the black can only be accomplished by operating the pin mixer at extremely high rotational speeds in order to apply the needed amount of work to the black or using more mixers or pins. This results in damage to the machinery and unsatisfactory pellets. It also requires a great expenditure of energy to rotate the pin mixer shafts at such a high speed.

Another deficiency of this type of process is the method of control of carbon black wetness. When using the prior art methods, the operator of the pin mixer takes samples of the finished pellets as they are emitted from the end of the pin mixer and tests them for moisture content. The time elapsing between the instant that particular black was wetted and added to the pelletizer and the time the operator can purge the pin mixer and obtain a test result for final pellet moisture content may be as long as 1½ or 2 hours which means that if the moisture content is wrong, production of unacceptable carbon black pellets has proceeded for possibly 2 hours, resulting in much wasted time and materials. In other words, the time lag in this feedback loop is 1½ to 2 hours, as compared to a few seconds for that of the present invention where errors in the moisture level of the black are detected and corrected almost instantaneously.

Also, in the present invention, due to the fact that by the time the black reaches the pelletizer it has already been wetted with a portion of the fluid normally added in pelletizing, the remaining liquid is accepted more readily and more even wetting of the black is the result. Just as a damp sponge absorbs water more easily than does a dry one, so does damp carbon black absorb a fluid more easily than dry carbon black. This means a better pellet is formed and pellet size distribution is in a very desirable, narrow range.

DESCRIPTION OF THE PREFERRED EMBODIMENTS

The presence of transient structure in addition to persistent structure in carbon black makes it necessary to apply physical work to the black such as by pin mixing at high speeds in order to reduce transient structure to a level where the black will exhibit a high pour density. It has been found that micropulverizing black in a very wet condition ($H_2O$ level above 50% of the total weight) results in a reduction of both transient and persistent structure and that micropulverizing absolutely dry black will not significantly alter either type structure under normal operating conditions.

It has been discovered that micropulverizing blacks which contain 5–50% water results in a reduction of the transient structure without altering the persistent or reinforcing type of structure. Thus it is possible to increase pour density of carbon blacks without altering the reinforcing properties of the black such as modulus, die swell, tensile strength, abrasion, tear strength, etc.

Above a 50% water level the carbon black exhibited a sharp alteration in abrasion resistance, modulus, and die swell. To stay within rubber product manufacturer's specifications it is essential that micropulverization of commercial black have no effect on measurable rubber properties. Although pour density measurements indicated a continuous increase above the critical level of about 50% water addition to the black, undesirable changes occurred in the specifications of the black with respect to rubber reinforcement.

Nevertheless, it should be emphasized that manufacturer's specifications for carbon black are used only as a means of predicting rubber properties. If a change in structure produces or leaves unaltered the rubber properties, such a change would be acceptable or advantageous even if accompanied by higher levels of moisture with resulting higher pour densities.

The novel feature of the process of this invention lies in the step of adding to the fluffy black a binder or a portion of the water usually added for pin mixing at or before the time the black is micropulverized. Thus the micropulverizer works the black in the presence of water to break down the transient structure of the black without affecting the persistent structure. The remainder of the water needed for pelletizing is added in the conventional manner in the pin mixing operation.

Intermediate super abrasion furnace (ISAF) carbon black is specified in ASTM designation N-220 as having a DBP absorption value of around 114, an iodine adsorption value of around 121, and a pour density of about 21.5 pounds per cubic foot.

Figure 1:
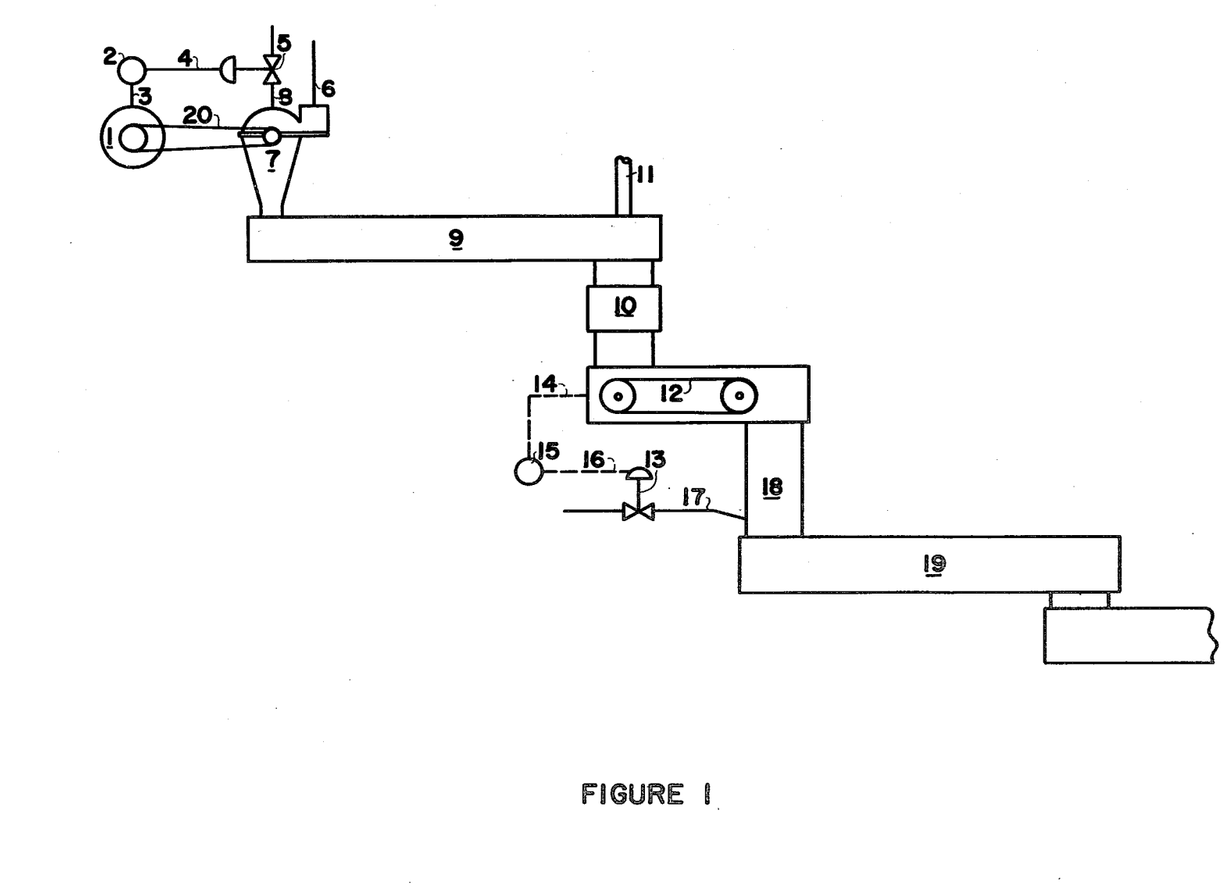
FIG. 1 is a schematic view of the densification apparatus which can be utilized to carry out the process of this invention.
Figure 2:
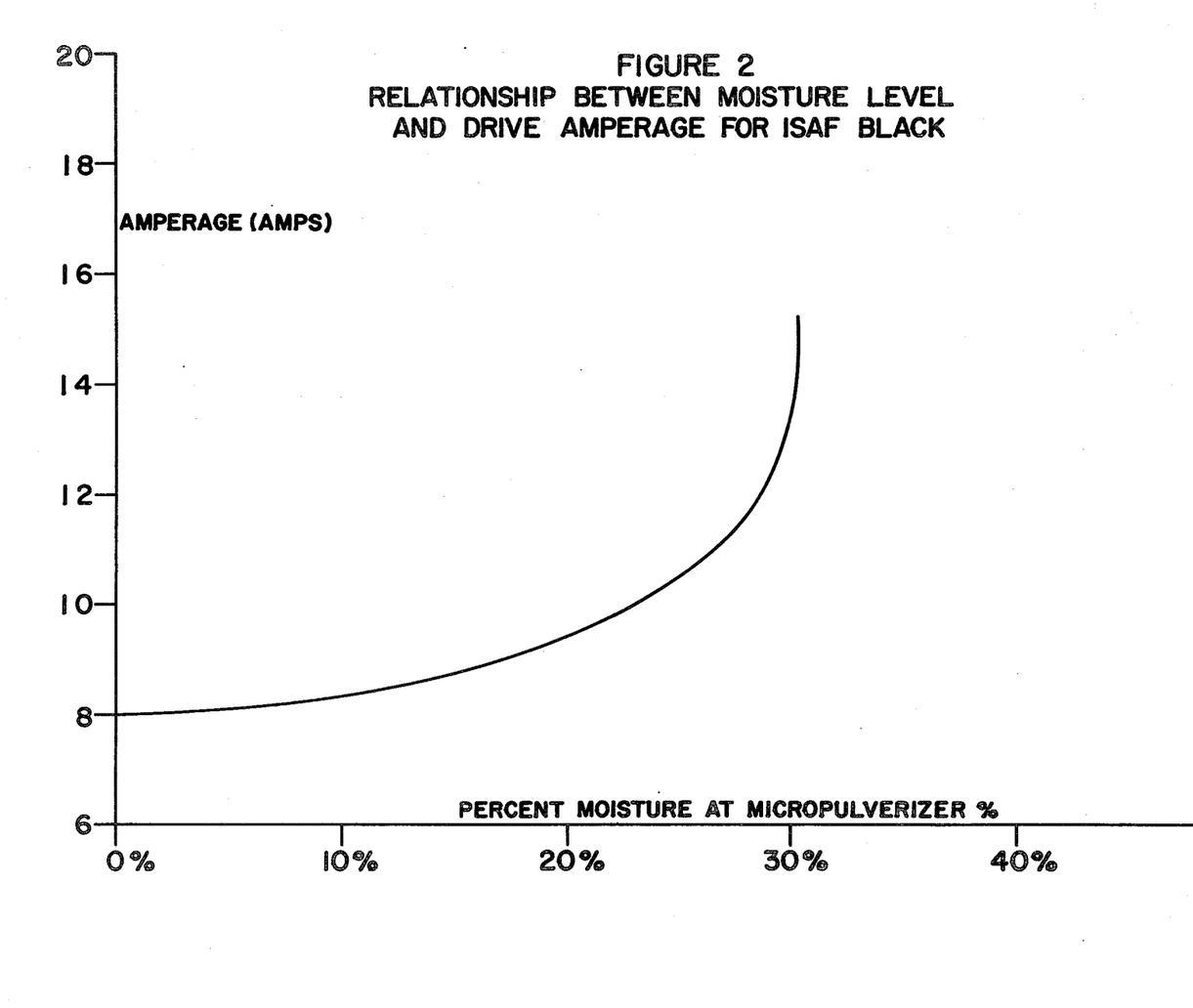
FIG. 2 is a graph of the relationship between moisture level in ISAF black and micropulverizer amperage required to mill the wet black.
Figure 3:
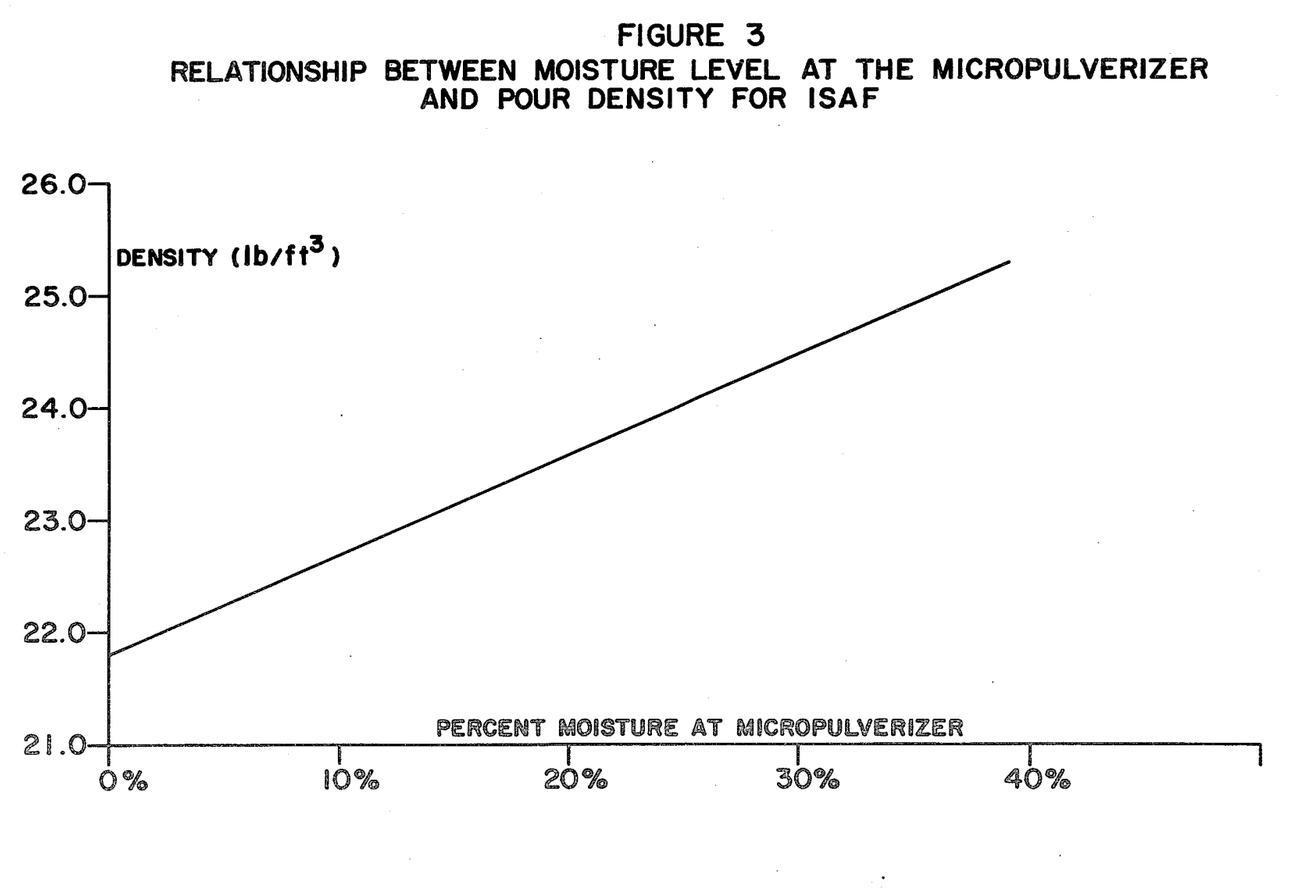
FIG. 3 is a graph showing the relationship between moisture level of ISAF black to be micropulverized and pour density after being milled, pelletized, and dried.
Figure 4:
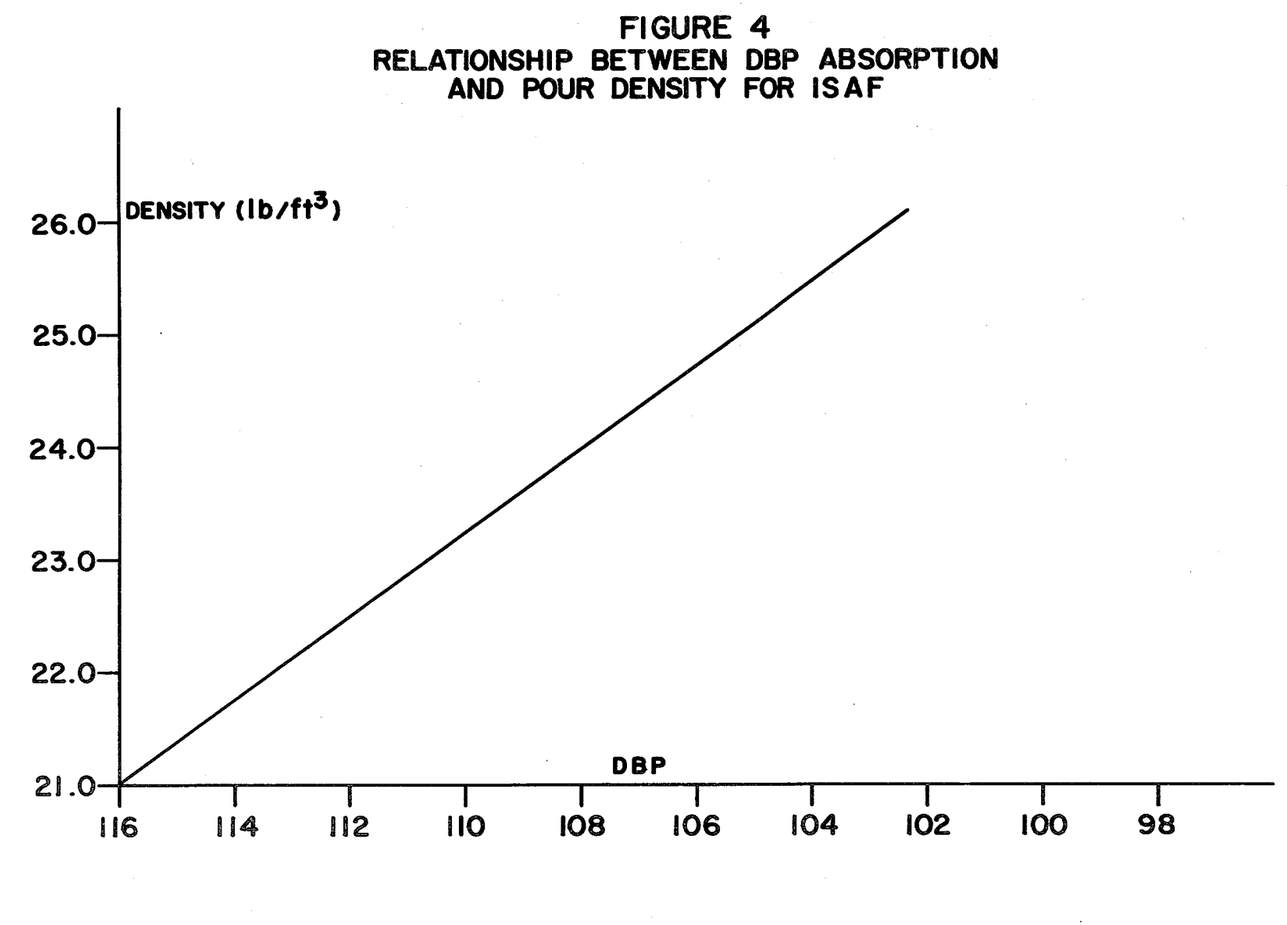
FIG. 4 is a graph showing the relationship between DBP values of ISAF black and pour density.

Referring to FIG. 1, a substantially constant supply of fluffy dry carbon black is added at tube 6 to a micropulverizer 7, such as a #2 SCB micropulverizer manufactured by the Pulverizing Machinery Company. A wetting liquid is supplied to a motor valve 5 and through that valve into micropulverizer supply line 8. Line 8 supplies the liquid directly into the working chamber of the micropulverizer 7 where the fluffy carbon black is being worked. The micropulverizer is driven by belt or chain 20 which is driven by electric motor 1. An amperage reading from motor 1 is constantly transmitted through electrical conduit 3 to an electric-pneumatic inverse proportion controller 2 which emits a pneumatic signal through air line 4 to pneumatically operated motor valve 5. The controller 2 is damped and converts electrical amperage readings from the motor 1 to pneumatic signals and directs them to motor valve 5 thereby controlling wetting liquid input to the micropulverizer. A significant, constant increase in amperage signal from the motor 1 causes a pneumatic signal to be transmitted to the motor valve 5, allowing it to close slightly and reduce the liquid being supplied to the black. The amperage requirement of the motor driving the micropulverizer is shown in FIG. 2 to be directly proportional to the amount of liquid in the black being worked. Thus an increase in the liquid content of the black being worked results in an increase of amperage drawn by the micropulverizer motor which in turn is conveyed to the controller partially closing the supply valve 5 and leveling out the liquid content at the desired preset amount. The wetting liquid is added to the black directly in the working chamber of the micropulverizer to minimize the time lag in the feedback control loop from the motor 1 to controller 2 and motor valve 5. Adding the wetting agent to the micropulverizer also aids in mixing it with the black faster and results in more even wetting.

The wetting liquid may be water, steam, a water-oil emulsion, a water based solution of a molasses type binder, organic or oleaginous liquids or any other suitable liquid. The water may be at ambient temperature or heated.

From the micropulverizer 7 the pulverized damp black drops into a screw conveyor 9 which contains air pressure relief valve 11 at its downstream end. The black passes down the screw conveyor and through a pressure tight air lock 10 which may be a device such as a star valve. From the air lock the damp black drops onto a weigh belt conveyor 12, such as one manufactured by the Wallace and Tiernan Company, where it is constantly weighed as it is being conveyed to the mixing chamber 18 through which it drops into the pelletizer 19.

A preset amount of wetting liquid is sprayed into the carbon black in chamber 18 from line 17 which passes through a pneumatically or electrically controlled valve 13. Damped weight signals from the weigh belt conveyor 12 are transmitted through conduit 14 to a directly proportional controller 15 which sends opening or closing signals to wetting fluid valve 13. An increase or decrease in the amount of black conveyed by the weigh belt 12 to the mixing chamber 18 results in a signal going through the feed-forward control loop to controller 15 and to valve 13 causing an accompanying increase or decrease in the amount of wetting fluid entering the mixing chamber 18. Thus a constant percentage of wetting fluid is maintained in the carbon black. From the mixing chamber 18 the black drops into the pelletizer 19 where it is formed into carbon black pellets and passed on to further processing such as drying and packaging. One type of pelletizer which has been found advantageous is the pin mixer type such as described in U.S. Pat. No. 3,528,785.

In the following test runs of the above apparatus, water was utilized as a wetting medium and was injected into the micropulverizer 7 which was a #2 SCB model manufactured by the Pulverizing Machinery Company. It was equipped with a standard herringbone screen with openings of 0.027 inches and was belt driven by a 30 horsepower electric motor containing an integral ammeter which measures amperage requirements and signals them to the controller 2.

Samples of black were taken at each level of moisture. The total amount of wetting liquid added in the micropulverizer and the pelletizer varied from 40–60% of the total weight of the black and the liquid. The amounts of fluid added in the micropulverizer varied from 0 to 60% by the total weight of black and fluid. It was found that in the range of 50–60% moisture, not only was transient structure reduced but also persistent structure was reduced.

Unless otherwise noted, all rubber testing of carbon black was conducted on LTP rubber samples compounded according to the following recipe:

| LTP RUBBER RECIPE | |
|---|---|
| Ingredients | Parts |
| LTP (SBR-1500, a styrene-butadiene rubber) | 100.0 |
| Furnace Carbon Black | 50.0 |
| Zinc Oxide | 5.0 |
| Stearic Acid | 1.5 |
| Circosol 2 XH | 7.5 |
| Santocure | 1.0 |
| Sulfur | 1.8 |
| Total | 166.8 |

In the examples below the carbon black samples were tested in the following manner for the following properties:

1. Iodine number: this test indicates a measure of the surface area of carbon black particles and is expressed as milligrams of iodine adsorbed on the surface of one gram of carbon black. The procedure, as described in ASTM specification D1510-69, involves mixing a measured weight of black into a measured volume of an iodine solution, agitating for a given period, centrifugation, then titration of a given volume of the iodine solution. A mathematical formula is used to convert the titration value to iodine number.

2. DBP or dibutyl phthalate absorption is an oil absorption test conducted on an automatic instrument, the absorptometer, and is believed to measure the structure of carbon black. The absorptometer has a mixing chamber with rotor blades which mix carbon black with the DBP oil. The oil is fed at a constant preset rate from a constant flow buret into a measured amount of carbon black in the machine. A torque sensing device in the machine cuts off the buret and the mixing rotors when a certain preset torque limit is reached. The buret reading is used to calculate the DBP number of the black. This procedure conforms to ASTM specification D2414-65T.

3. Pour density as used in these tests is the weight of densified carbon black per unit volume and is determined by ASTM procedure D1513-60. The carbon black to be measured is poured into the center of a cylindrical container of known volumetric capacity, usually 624 milliliters, from a height not exceeding 2 inches above the top rim. A large enough excess is poured to form a cone of the material above the top rim of the container. The surface is then levelled by sweeping a straight edge tightly across the top rim. The carbon black remaining in the container is then weighed and its pour density calculated.

4. Die swell is a measure of the amount of swell a rubber compounded with carbon black undergoes when forced through a restricted opening such as an extrusion die. The test is conducted by extruding a tube of the rubber through a ⅛" or 3/16" annular die, allowing it to cool one hour, cutting a sample exactly 100 centimeters in length and accurately weighing the 100 cm sample. The weight is divided by the specific volume of the rubber to obtain the extruded volume. Percent diameter swell is determined by the calculation:

$$\% \text{ swell} = \frac{\text{extruded volume} - \text{standard volume}}{\text{standard volume}} \times 100$$

The die standard volume is calculated by a known formula for each size die.

5. 300% modulus is the tensile load in pounds per square inch of cross-sectional area of a rubber sample which causes the sample to stretch or elongate 300%. The elongation is measured as a percentage of the orginial length of the sample. The test is conducted according to ASTM procedure No. D412. Rubber samples are cured for varying lengths of time prior to testing.

6. Tensile strength is the force per unit cross-sectional area of a rubber sample that is required to break the sample. It is measured by using a rubber specimen of known cross-sectional area and applying a tensile load to it until the specimen breaks. The tensile load causing breakage divided by the original cross-sectional area is the tensile strength for the specimen. The test is conducted according to ASTM procedure No. D412.

7. Mooney scorch of elastomeric substances is determined by ASTM procedure D1646-68, and is defined as the time in minutes for a specified rise in Mooney viscosity number resulting from the change in viscosity in the Mooney viscometer. It indicates the tendency of rubber to vulcanize during processing.

8. Mooney viscosity is also determined by ASTM procedure D1646-68. The elastomeric material is tested in the Mooney viscometer by subjecting it to shearing forces therein. The greater the resistance of a material to shear, then the higher the Mooney viscosity value. Either a large-rotor viscosity (ML) or small-rotor viscosity (MS) may be obtained. The viscosity is determined by measuring the torque on the rotor when turning in the rubber at a given RPM.

9. Abrasion resistance is the ability of a rubber compound to withstand mechanical action such as rubbing, scraping, or erosion, all of which tend to progressively remove material from the surface of the rubber. A Goodyear abrasion machine is used which utilizes a rotating abrasive wheel contacting the rubber sample.

10. Surface area, porosity, and external surface area are calculated using the BET (Brunauer, Emmett, and Teller) equations as described in the *Journal of the American Chemical Society* 60, 309 (1938). These equations are used in conjunction with corrections proposed by Voet in *Rubber World* 139, 63, 232 (1958).

11. Transmittance, or benzene transmittance, values of the black are determined in compliance with ASTM procedure D1618-65T. In this test a measured weight of carbon black is mixed in a specified volume of chemically pure benzene and the mixture is boiled for 20 seconds. The volume is kept constant by adding pure benzene. The mixture is filtered and the liquid is placed in a spectrophotometer to measure light transmittance through it. The result is expressed as a percentage of the transmittance of pure uncontaminated benzene. The test is used to determine the amount of uncoverted hydrocarbons remaining on the surface of the carbon black.

The following table shows the properties of an ISAF black manufactured by the use of the above process and apparatus.

TABLE I

ISAF PREPARED BY WET MICROPULVERIZATION

| Moisture level, % by total weight of the black and water at micropulvverizer | 0 | 23 | 34 |
|---|---|---|---|
| Pour Density, lb/ft³, dry basis | 21.0 | 24.0 | 25.1 |
| 300% Modulus, psi | 2170 | 2100 | 2100 |
| Tensile strength, psi | 4400 | 4080 | 4280 |
| Die swell, % | 100 | 99 | 101 |
| Abrasion, % | 100 | 101 | 95 |
| Heat-Build-up, °F. | 293 | 292 | 298 |
| Mooney Scorch, MS at 275° F. | 31 | 32 | 33 |
| Mooney Viscosity, ML 4' at 212° F. | 73 | 73 | 73 |
| DBP Absorption cc/100 g. | 116 | 109 | 107 |
| Iodine | 121 | 122 | 122 |

Thus it can be seen that a pour density gain of 4.1 pounds per cubic foot of carbon black can be accomplished by this process. This gain is vitally important in cutting down transportation costs since much carbon black is shipped on a per carload cost basis and an increase in shipping density results in lower shipping costs per pound of carbon black. Higher pour density also results in savings in packaging and storing.

An example of the resulting change in micropulverizer power consumption with a change in moisture content of the black is given in the following table.

TABLE II

AMPERAGE READING FOR MICROPULVERIZER DRIVE MOTOR

| Water Added, % by Weight | Average Load, amps |
|---|---|
| 0 | 8 |
| 15 | 9 |
| 23 | 10 |
| 28 | 12 |
| 30 | 15 |
| 33 | 18 |

EXAMPLE I

As an example to demonstrate the increase in pour density and decrease in transient structure, samples of ISAF as previously described and High Structure HAF carbon black were tested in the unmilled condtion and in the wet milled state.

High Structure HAF carbon black is commonly called High Abrasion furnace black and is designated by ASTM designation N-347 or N-339. N-347 has a typical iodine adsorption value of around 90, a typical DBP oil absorption value of around 124, and a typical pour density of around 21 lb/ft³.

Unmilled samples of High Structure HAF carbon black are prepared in a standard carbon black oil furnace such as that described in U.S. Pat. No. 2,917,370 and then passed to the micropulverizer after being cooled to around 150°–175° F.

The following tables reveal the results of micropulverizing ISAF and High Structure HAF blacks on a commercial micropulverizer.

TABLE III

PROPERTIES OF ISAF SAMPLES

| Water added, % of total weight | 0 | 10 | 20 | 30 | 35 | 40 | 45 | 50 | 55 | 60 |
|---|---|---|---|---|---|---|---|---|---|---|
| DBP Absorption, cc/100 gms. | 109 | 107 | 106 | 103 | 101 | 101 | 99 | 90 | 90 | 90 |
| Specific Volume, cc/100 gms. | 129.9 | 128.8 | 128.3 | 127.6 | 127.0 | 126.8 | 126.3 | 120.5 | 118.8 | 120.4 |
| Pour Density, lbs/ft³ | 23.0 | 23.4 | 23.7 | 23.9 | 24.5 | 24.6 | 24.7 | 25.6 | 26.2 | 26.4 |
| Iodine No., mg/gm | 111.8 | 112.2 | 112.7 | 113.0 | 113.1 | 113.2 | 112.9 | 112.5 | 112.5 | 112.1 |
| pH | 8.4 | 8.4 | 8.6 | 8.6 | 8.7 | 8.7 | 8.9 | 8.2 | 7.7 | 7.5 |
| 300% Modulus, psi | 1885 | 1880 | 1860 | 1855 | 1850 | 1840 | 1850 | 1795 | 1665 | 1675 |
| Tensile Strength psi | 3750 | 3790 | 3880 | 3910 | 3960 | 3820 | 3710 | 3910 | 4030 | 4050 |
| Die Swell, % | 100 | 99.8 | 99.2 | 99.4 | 99.0 | 100.1 | 100.6 | 107.3 | 110.7 | 111.2 |
| Abrasion, % | 100 | 99.8 | 99.7 | 99.4 | 99.3 | 99.0 | 98.4 | 96.4 | 93.4 | 91.3 |
| Firestone HBU, °F. | 285 | 285 | 286 | 288 | 289 | 286 | 287 | 287 | 283 | 284 |

(Note: Stress-strain data reported for 60' cure in LTP recipe).

TABLE IV

PROPERTIES OF HIGH STRUCTURE HAF SAMPLES

| Water added, % of total weight | 0 | 20 | 35 | 45 | 48 | 50 | 53 | 56 | 60 |
|---|---|---|---|---|---|---|---|---|---|
| DBP Absorption, cc/100 gms. | 129 | 124 | 122 | 122 | 119 | 119 | 108 | 102 | 96 |
| Specific Volume, cc/100 gms. | 142 | 139 | 138 | 134 | 134 | 134 | 129 | 127 | 125 |
| Pour Density, lbs/ft³ | 20.5 | 20.9 | 21.0 | 22.5 | 23.0 | 23.2 | 23.8 | 25.3 | 25.4 |
| Iodine No., | | | | | | | | | |

TABLE IV-continued
PROPERTIES OF HIGH STRUCTURE HAF SAMPLES

| Water added, % of total weight | 0 | 20 | 35 | 45 | 48 | 50 | 53 | 56 | 60 |
|---|---|---|---|---|---|---|---|---|---|
| mg/gm | 86.6 | 86.4 | 86.1 | 85.9 | 85.4 | 85.8 | 85.4 | 86.4 | 84.6 |
| pH | 8.5 | 8.6 | 8.5 | 8.7 | 8.0 | 8.2 | 7.7 | 7.0 | 6.5 |
| 300% Modulus, psi | 2050 | 2030 | 2000 | 2040 | 2110 | 1970 | 1790 | 1770 | 1700 |
| Tensile Strength, psi | 3720 | 3740 | 3520 | 3840 | 3880 | 3720 | 3560 | 3670 | 3960 |
| Die Swell, % | 100 | 100.1 | 101.5 | 104.1 | 106.5 | 104.1 | 116.5 | 124.1 | 127.7 |
| Abrasion, % | 100 | 100.5 | 100.6 | 98.8 | 98.8 | 95.0 | 95.2 | 93.7 | 92.8 |
| Firestone HBU, °F. | 281 | 279 | 279 | 279 | 280 | 283 | 280 | 277 | 278 |

(Note: Stress-strain data reported for 60' cure in LTP recipe.)

From the above two tables showing the results of micropulverization on wet samples of ISAF and High Structure HAF, it can be seen, that with respect to rubber reinforcing properties, a critical moisture level content would be from 45 to 50% of the total weight of water and black. Above this level the vulcanizate properties of the blacks begin to change rather drastically. the black begins to drop off sharply when it is micropulverized with greater than 50% level of moisture.

Variations greater than 100 psi in 300% modulus, 100 psi in tensile strength, and 5% in abrasion resistance are outside the limits of expected error and thus would mean that a significant change in the specifications has occurred.

TABLE V
PROPERTIES OF HIGH STRUCTURE HAF SAMPLES PREPARED BY WET MICROPULVERIZATION

| Water added, % of total weight, | 0 | 10 | 20 | 30 | 35 | 37 | 43 | 50 | 60 |
|---|---|---|---|---|---|---|---|---|---|
| DBP Absorption, cc/100 gms. | 122 | 119 | 117 | 113 | 112 | 110 | 106 | 104 | 96 |
| Specific Volume, cc/100 gms. | 143.1 | 140.8 | 137.9 | 136.2 | 136.0 | 134.7 | 132.7 | 131.2 | 129.9 |
| Pour Density, lbs/ft$^3$ | 20.6 | 21.0 | 21.9 | 22.2 | 22.4 | 22.4 | 23.0 | 23.7 | 25.0 |
| Iodine No., mg/gm | 93.6 | 93.5 | 93.9 | 93.7 | 94.0 | 92.4 | 92.1 | 92.4 | 91.0 |
| pH | 9.1 | 9.0 | 8.8 | 8.9 | 8.8 | 8.8 | 8.6 | 8.1 | 6.7 |
| 300% Modulus, psi | 2175 | 2170 | 2160 | 2150 | 2155 | 2185 | 2180 | 1920 | 1770 |
| Tensile Strength, psi | 3720 | 3730 | 3720 | 3690 | 3700 | 3560 | 3650 | 3570 | 3500 |
| Die Swell, % | 100.0 | 100.3 | 100.4 | 101.0 | 101.7 | 97.6 | 102.1 | 105.5 | 126.1 |
| Abrasion, % | 100.0 | 100.6 | 100.9 | 101.5 | 101.4 | 104.2 | 102.7 | 97.7 | 95.4 |
| Firestone HBU, °F. | 290 | 286 | 287 | 289 | 287 | 285 | 288 | 286 | 284 |

(Note: Stress-strain data reported for 60' cure in LTP recipe.)

Between 48% and 60% moisture level the 300% modulus for rubber dropped from 2110 psi to 1700 psi after it had remained fairly level up to 48% moisture. Likewise, the tensile strength began to decrease noticeably in the range from 48% moisture level to 56% moisture level indicating a reduction in the persistent structure of the black.

The abrasion resistance was fairly constant up to 48% moisture since the expected error in abrasion testing runs as high as 5%. Above 48% moisture, the abrasion resistance begins to drop off showing an undesirable degrading of the rubber, with a drop of 6% abrasion resistance when increasing moisture level from 48% to 60%.

Thus, a reduction of 1.7 points in pH, reduction of 410 psi in 300% modulus, reduction of 320 psi in tensile strength and an abrasion resistance reduction of 6.2% are significant indicators that the reinforcing ability of the black begins to drop off sharply when it is micropulverized with greater than 50% level of moisture.

The above tabulation of results from the micropulverization of High Structure HAF black on a large, commercial scale micropulverizer indicates that the critical level of moisture content for commercial micropulverization is from 50 to 60%.

EXAMPLE III

Samples of unmilled HAF black and wet milled HAF black from the same production batch were compounded in three different elastomeric substances. Runs 1 and 2 were conducted on butyl rubber which is a copolymer of about 97% isobutylene and 3% isoprene polymerized instantaneously in methyl chloride and aluminum chloride with a trace of water. Runs 3 and 4 were conducted with compounds of natural rubber which is obtained from botanical sources and runs 5 and 6 were conducted with compounds of LTP (low temperature polymerization rubber) which is a styrenebutadiene rubber, SBR-1500.

TABLE VI

RUBBER PROPERTIES OF WET MILLED BLACK IN THREE TYPES OF RUBBER

| | Black, Type | 300% Modulus PSI | Tens. Str. PSI | Abras. Resist. % | Hardness | Rebound | | Tear Strength | Banbury Dump Temp. °F. & Time | Mooney Visc. | Mooney Scorch | |
|---|---|---|---|---|---|---|---|---|---|---|---|---|
| | | | | | | % Energy | Indent. | | | | Minimum Reading | Time Min. |
| 1. | Unmilled HAF Control | 1500 | 2500 | 100.0 | 64 | 70.3 | .274 | 200 | 300° F. 5.75' | 76.0 | 34 | 43.5 |
| 2. | Wet Milled HAF Black | 1600 | 2630 | 136.5 | 65 | 70.5 | .275 | 210 | 315° F. 5.75' | 75.0 | 35 | 49 |
| 3. | Unmilled HAF Control | 1540 | 4280 | 100.0 | 66 | 66.9 | .232 | 465 | 230 | 64.0 | 36 | 14 |
| 4. | Wet Milled HAF Black | 1540 | 4410 | 113.9 | 67 | 67.4 | .228 | 630 | 250 | 70.0 | 38 | 27 |
| 5. | Unmilled HAF Control | 1580 | 4090 | 100.0 | 66 | — | — | 295 | 255 | 65.0 | 27.0 | 17.0 |
| 6. | Wet Milled HAF Black | 1800 | 4250 | 141.0 | 67 | — | — | 325 | 290 | 71.0 | 29.5 | 22.0 |

From the above comparison, it is clear that the wet milled or wet micropulverized reinforcing black is at least equal to unmilled black when used in rubber.

In the above examples, such as in Table IV, the trend in rubber properties in the carbon blacks either showed increases or remained at a constant level in the desirable properties up to a moisture content of around 50%. Above this moisture level the characteristics began to degrade.

Those properties which were improved by increasing moisture content are pour density, which showed a desirable increase from 20.5 lb/ft$^3$ at 0% water up to 25.4 lb/ft$^3$ at 60% water, and tensile strength which increased from 3720 psi at 0% moisture up to 3880 psi at 48% moisture.

It was an object of this invention to increase pour density without degrading any of the significant physico-chemical or rubber properties of the carbon black produced. The fact that these properties remained constant within the limits of experimental error, or showed improvements, is convincing evidence that the object is achieved.

The rubber data which includes 300% modulus, tensile strength, die swell, abrasion resistance, and heat build up, were not significantly changed except for the improvement (increase) in tensile strength. The 300% modulus showed an increase which, although desirable, was not enough to fall outside the range of error for that test. The range of error in 300% modulus and tensile strength testing is around 100 psi. The 140 psi increase in tensile strength at 48% moisture was outside the expected limits of error and can be considered as an improvement. The die swell increased by 6.5% at 48% moisture level in Table IV and about 5.0% in the second run in Table V. This is near the limits of experimental error for this type of test which is about 4%. A slight increase in die swell may be advantageous depending upon the use to be made of the elastomer in its final product form.

The error in abrasion resistance testing is approximately ±5% and the runs in Tables IV and V were constant within this limit up to about 48% moisture. The abrasion resistance in Table IV showed a decrease of 1.2% at 48% moisture, well within the expected limits of error. In Table V the abrasion resistance increased 4.2% at 37% moisture and then dropped to an increase of 2.7% at 43% moisture indicating that at the maximum safe moisture content of 48–50% the abrasion resistance would be the same as the control sample within expected range of error.

While the above methods and embodiments successfully achieved the stated objectives, it is clear that other alternatives would be obvious in light of the disclosed embodiments. Such alternatives would include wet micropulverizing a portion of the carbon black being produced and blending it with the remaining unpulverized black. This would increase production rates while still achieving an increase in pour density of the resulting black.

Another obvious alternative to the above embodiments of the present invention would be multiple-pass micropulverization which could be accomplished by either recycling the pulverized black back through a single micropulverizer or using a plurality of micropulverizers arranged in series.

Another obvious alternative to one machine, single-pass micropulverizing would be to utilize more than one micropulverizer in parallel to increase micropulverizing rates and thereby increase production rates.

A final alternative would be to utilize other types of physical working apparatus in place of the micropulverizer. Many types of high speed mills are commercially available which would provide the necessary physical work on the black as long as the moisture could be added to the black while in the milling machine and the power requirement of the machine could be directly measured in order to form the feed-back loop to control water input.

There are several factors influencing the structure changes occurring in the carbon black in the wet micropulverization process. One is the amount of work done on the carbon black and the other is the severity of the work applied to the black. The severity of the work determines whether or not the persistent structure will be reduced thereby degrading the desirable properties of the black. The severity of the work depends upon the type of machine used and also upon the amount of moisture added to the black. Adding moisture to the black increases its ability to absorb work or mechanical energy. It is believed that each given machine, depending upon its speed of operation and aggressiveness toward the black, has a critical moisture level for the black, above which the persistent structure will be destroyed. For the particular micropulverizer employed in this invention that level appeared to be at or near 50%.

The amount of work added to a black, as long as it is below the critical severity, determines the amount of reduction in transient structure that occurs. Thus a time element is introduced into the process. It is believed that the black can be physically worked as long as necessary until substantially all transient structure is reduced. This is done by recycling or multiple-pass milling of the black without applying energy above the critical severity limit at any time. Thus a maximum pour density is obtainable without adversely affecting the desirable properties of the carbon black.

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. For example, this invention could be utilized to manufacture other grades of carbon black than HAF or ISAF or may even be used in applications other than carbon black manufacture, such as in artificial zeolites and pigments. The invention is declared to cover all changes and modifications of the specific example of the invention herein disclosed for purposes of illustration, which do not constitute departures from the spirit and scope of the invention.

What we claim is:

1. A method of increasing the pour density of carbon black without adversely altering its properties of 300% modulus, tensile strength, abrasion resistance, and pH when compounded in an elastomeric substance, which comprises:
    (a) flowing at a constant rate into a curved herringbone patterned screen-type motor-driven micropulverizer a fluffy dry carbon black which was manufactured by the incomplete combustion of hydrocarbons;
    (b) micropulverizing the carbon black within the micropulverizer;
    (c) simultaneously adding a wetting agent to the black in the micropulverizer in the amount of 10–50% by weight of the wetted carbon black;
    (d) measuring the power requirements of the motor-driven micropulverizer;
    (e) relaying the power requirements to a damped inverse-proportioned controller;
    (f) generating pneumatic signals in the controller in inverse proportion to the power requirement signals;
    (g) conveying said pneumatic signals to a pneumatically actuated valve in the supply line of said wetting agent to maintain a constant ratio of carbon black to wetting agent in the micropulverizer;
    (h) conveying said pulverized wetted carbon black to an air lock chamber containing an air pressure relief valve;
    (i) passing said carbon black through said air chamber onto a weigh-belt conveyor;
    (j) continuously conveying said wetted carbon black on said weigh-belt conveyor to a carbon black pelletizer;
    (k) simultaneously weighing the wetted carbon black contained on said weigh-belt conveyor;
    (l) converting said weigh measurements into weight measurement signals;
    (m) directing said weight measurement signals in a feed-forward loop to a direct-proportional controller;
    (n) generating signals in said controller directly proportional to said weight measurement signals;
    (o) supplying wetting agent through a motor valve to the pelletizer in the amount of 10% to 60% by weight of the wetted black;
    (p) varying the flow through said motor valve using said generated signals from said controller; and
    (q) pelletizing said carbon black in said pelletizer, said carbon black pellets having increased pour density.

* * * * *